United States Patent [19]

Komiyama

[11] Patent Number: 5,621,618

[45] Date of Patent: Apr. 15, 1997

[54] PORTABLE ELECTRONIC APPARATUS WITH BATTERY PACK SECURED BY FIRST AND SECOND SEQUENTIALLY ENGAGEABLE RECESSES

[75] Inventor: Takehiko Komiyama, Tokyo, Japan

[73] Assignee: NEC Corporation, Tokyo, Japan

[21] Appl. No.: 662,365

[22] Filed: Jun. 12, 1996

[30] Foreign Application Priority Data

Jun. 12, 1995 [JP] Japan ................................. 7-169245

[51] Int. Cl.⁶ ........................... H05K 7/14; H04B 1/03; H01M 2/10
[52] U.S. Cl. ........................... 361/732; 429/97; 361/814
[58] Field of Search ..................... D13/103; D14/137, D14/138; 429/96, 97, 98, 99, 100, 146, 149, 239; 361/679, 725, 726, 732, 814

[56] References Cited

U.S. PATENT DOCUMENTS

| D. 358,128 | 5/1995 | Berry et al. ........................ D13/103 |
| 4,146,682 | 3/1979 | Nakao ................................. 429/97 |
| 5,251,105 | 10/1993 | Kobayashi et al. ............... 361/683 |
| 5,415,955 | 5/1995 | Kobayashi et al. ............... 429/97 |

FOREIGN PATENT DOCUMENTS 5-344042  12/1993  Japan .

Primary Examiner—Michael W. Phillips
Assistant Examiner—David Foster
Attorney, Agent, or Firm—Sughrue, Mion, Zinn, Macpeak & Seas

[57] ABSTRACT

In a portable electronic apparatus having a casing and a battery pack removably mounted to a mounting portion included in the casing, a movable hook is positioned in the mounting portion and resiliently movable into or out of the mounting portion when a release button mounted on the casing is operated. A first recess is formed in the battery pack and engageable with the movable hook when the battery pack is mounted to the mounting portion. A second recess adjoins the first recess, but is positioned closer to the mounting portion than the first recess. The second recess is engageable with the movable hook when the battery pack moves away from the mounting portion after the first recess has been released from the movable hook.

3 Claims, 4 Drawing Sheets

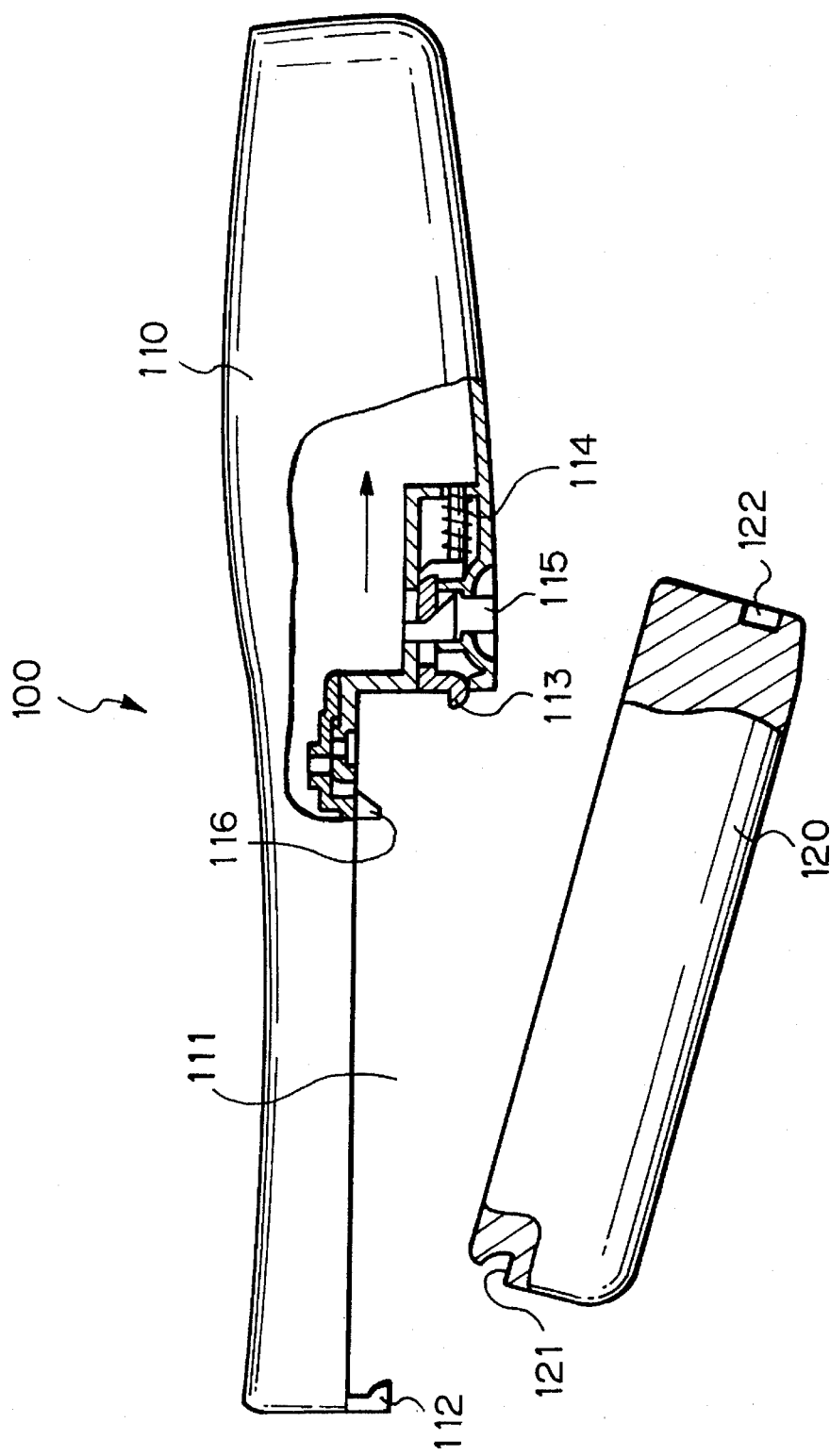

1

PORTABLE ELECTRONIC APPARATUS WITH BATTERY PACK SECURED BY FIRST AND SECOND SEQUENTIALLY ENGAGEABLE RECESSES

BACKGROUND OF THE INVENTION

The present invention relates to a handy phone, portable video camera or similar portable electronic apparatus powered by a removable battery and, more particularly, to a portable electronic apparatus capable of preventing a battery pack from slipping out.

An electronic apparatus of the kind described has a casing and a battery pack removably mounted to a mounting portion included in the casing. Usually, the mounting portion has a stationary hook and a movable hook while the battery pack has a first and a second recess for mating with the stationary hook and movable hook, respectively. A release button is mounted on the casing in order to release the movable hook from the second recess. To remove the battery pack from the casing, the release button is pressed to release the movable hook from the second recess. As a result, the battery pack is unlocked from the casing and can be pulled out by hand. An electronic apparatus of the type holding a battery pack on its casing with the above movable hook and recess is disclosed in, e.g., Japanese Patent Laid-Open Publication No. 5-344042.

However, the conventional apparatus relying on the movable hook and recess scheme lacks an implementation for preventing the battery pack from slipping out of the casing by accident. Therefore, even when the release button is pressed by accident, the movable hook is released from the associated recess and causes the battery pack to drop from the casing. The battery pack dropped from the casing is often damaged or damages objects surrounding it.

To solve the above problem, extra locking members may be added to the casing and battery pack. However, the extra locking members increase the number of constituent parts, complicate the construction, and increase the overall size of the apparatus. This is undesirable from the portability standpoint.

SUMMARY OF THE INVENTION

It is therefore an object of the present invention to provide a portable electronic apparatus capable of surely preventing a battery pack from slipping out of a casing despite its simple construction.

In accordance with the present invention, a portable electronic apparatus has a casing and a battery pack removably mounted to a mounting portion included in the casing. A movable hook is positioned in the mounting portion and resiliently movable into or out of the mounting portion when a release button mounted on the casing is operated. A first recess is formed in the battery pack and engageable with the movable hook when the battery pack is mounted to the mounting portion. A second recess adjoins the first recess, but is positioned closer to the mounting portion than the first recess. The second recess is engageable with the movable hook when the battery pack moves away from the mounting portion after the first recess has been released from the movable hook.

BRIEF DESCRIPTION OF THE DRAWINGS

The above and other objects, features and advantages of the present invention will become apparent from the following detailed description taken with the accompanying drawings in which:

FIG. 1 is a partly sectional side elevation showing a conventional portable electronic apparatus;

DESCRIPTION OF THE PREFERRED EMBODIMENTS

Figure 2A:
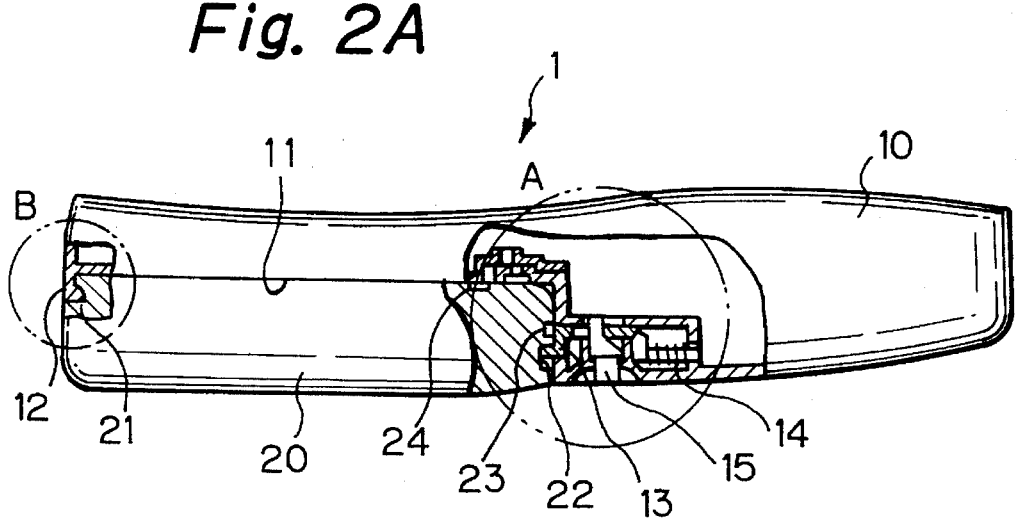
FIG. 2A is a partly sectional side elevation showing a portable electronic apparatus embodying the present invention in a condition wherein a battery pack is held in a full-locked state.

To better understand the present invention, a brief reference will be made to a conventional portable electronic apparatus, shown in FIG. 1. As shown, the apparatus is implemented as a handy phone 100 by way of example. The handy phone 100 is generally made up of a casing 110 and a battery pack 120. The casing 110 has a portion 111 for mounting the battery pack 120. A stationary hook 112 and a movable hook 113 are respectively positioned on one end and the other end of the mounting portion 111. The movable hook 113 is constantly biased by a spring 114. When a release button 115 is operated by finger, the hook 113 is selectively extended or retracted through the wall of the mounting portion. A connection terminal 116 is affixed to the bottom of the mounting portion 111 so as to resiliently contact a connecting portion provided on the battery pack 120. A recess 121 is formed in one end of the battery pack 120 and engageable with the stationary hook 112. A recess 122 is formed in the other end of the battery pack 120 and engageable with the movable hook 113.

To mount the battery pack 120 to the casing 110, the recess 121 of the pack 120 is engaged with the stationary hook 112 of the casing 110. Then, the pack 120 is bodily rotated about the hook 112 toward the casing 110 until the recess 122 mates with the movable hook 113 (locked condition). As a result, the pack 120 is held by the mounting portion 111 of the casing 110. When the release button 115 is pressed by finger, the movable hook 113 is released from the recess 122. Consequently, the pack 120 is unlocked from the casing 110 and can be removed from the mounting portion 111.

The above portable apparatus 100 relying on the hook and recess locking scheme has some problems left unsolved, as discussed earlier.

Referring to FIGS. 2A, 2B, 3A, 3B and 4, a portable electronic apparatus embodying the present invention will be described. As shown in FIG. 2A, the apparatus implemented as a handy phone 1 by way of example has a casing 10 and a battery pack 20. The casing 10 has a portion 11 for mounting the battery pack 20. A stationary hook 12 and a movable hook 13 are respectively positioned on one end and the other end of the mounting portion 11 (see also FIG. 3B).

Figure 2B:
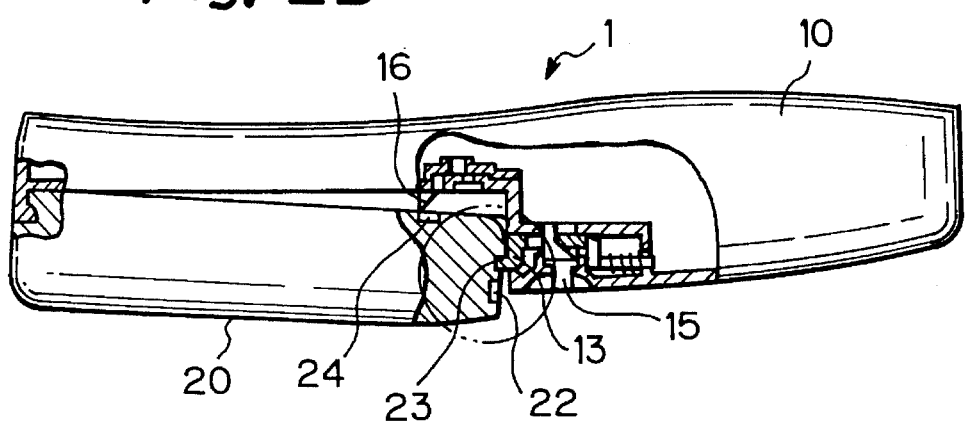
FIG. 2B is a view similar to FIG. 2A, showing the apparatus in a condition wherein the battery pack is held in a half-locked state.
Figure 2C:
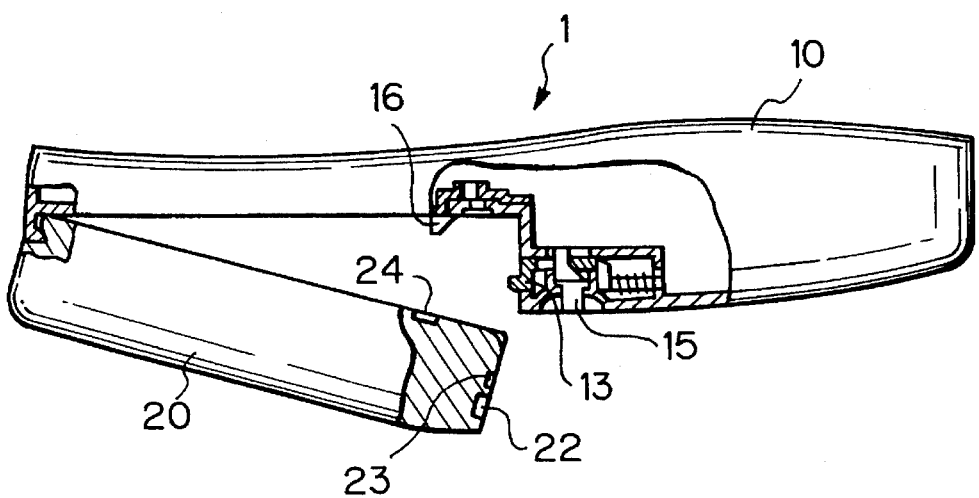
FIG. 2C is a view similar to FIG. 2A, showing the apparatus with the battery pack unlocked.
Figure 3A:
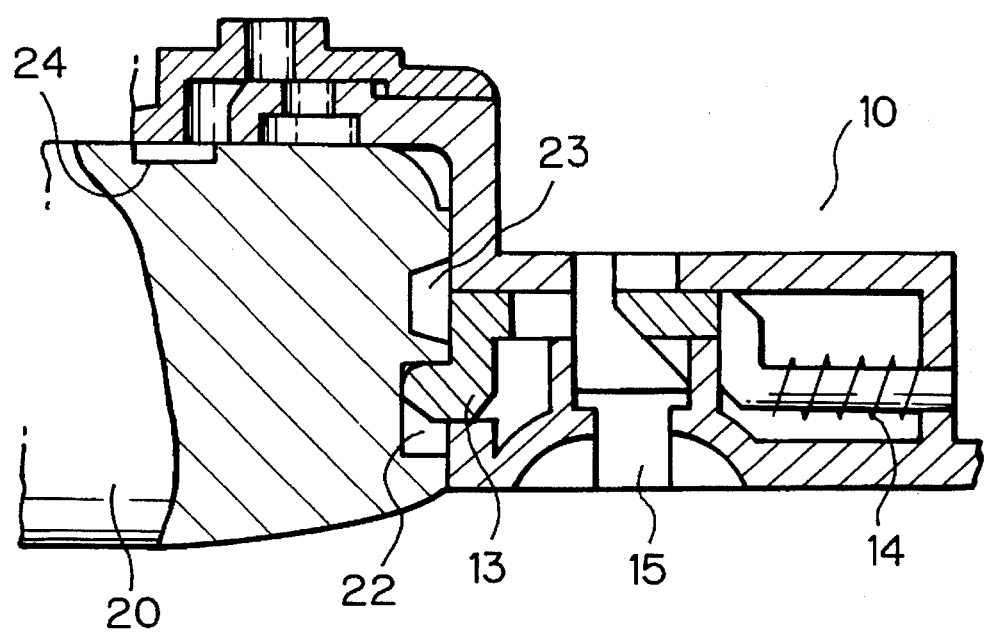
FIG. 3A is a fragmentary section of a portion labeled A in FIG. 2A.

As shown in FIG. 3A, the movable hook 13 is constantly biased by a spring 14. When a release button 15 is operated, the movable hook 13 is selectively extended or retracted through the wall of the mounting portion 11. As shown in FIGS. 2B and 2C, a connection terminal 16 is affixed to the bottom of the mounting portion 11 so as to resiliently contact a connecting portion 24 provided on the battery pack 20.

Figure 3B:
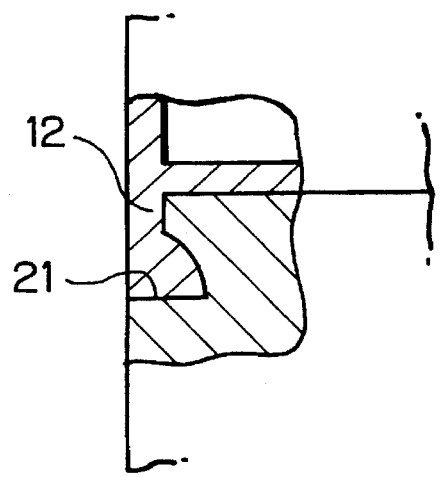
FIG. 3B is a fragmentary section of another portion labeled B in FIG. 2A.

A recess 21 is formed in one end of the battery pack 20 and engageable with the stationary hook 12 (see also FIG. 3B). A recess 22 is formed in the other end of the battery pack 20 and engageable with the movable hook 13 (see also FIG. 3A).

Figure 4:
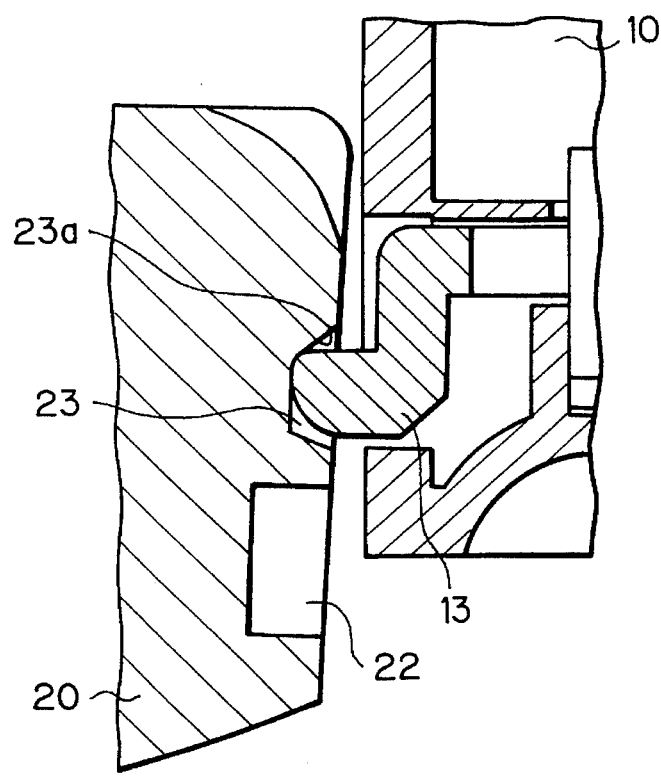
FIG. 4 is a fragmentary section of a portion labeled C in FIG. 2B.

A second recess 23 is formed in the same end of the battery pack 20 as the first recess 22 (see also FIG. 3A). The second recess 23 is positioned closer to the mounting portion 11 than the first recess 22 when the battery pack 20 is mounted to the portion 11. The recess 23 is configured such that when the battery pack 20 moves away from the mounting portion 11 after its recess 22 has been released from the movable hook 13, the recess 23 mates with the hook 13. Further, as shown in FIG. 4, the recess 23 has a slant wall 23a contacting the movable hook 13 and inclined toward the mounting portion.

How the battery pack 20 is removed from the casing 10 will be described with reference to FIGS. 2A–2C. Assume that the release button 15 is pressed while the battery pack 20 is held in a full-locked state shown in FIG. 2A. Then, the movable hook 13 is released from the first recess 22 with the result that the battery pack 20 tends to slip out of the mounting portion 11. However, as shown in FIG. 2B, the second recess 23 following the recess 22 mates with the hook 13 and maintains the battery pack 20 in a half-locked state. Subsequently, when the battery pack 20 is pulled away from the mounting portion 11 by hand, the recess 23 is released from the hook 13. Consequently, the pack 20 is removed from the mounting portion (see FIG. 2C).

As stated above, the embodiment surely prevents the battery pack 20 from slipping out of the casing 10 with the simple second recess 23 formed in the pack 20. The pack 20 is therefore free from damage ascribable to accidental fall and promotes easy handling of the apparatus 10. In addition, the embodiment does not deteriorate the portability of the apparatus 10 at all because it does not need any additional locking member.

Further, the wall 23a of the second recess 23 for contacting the movable hook 13 is inclined toward the mounting portion 11. This allows the recess 23 to be released from the hook 13 only if the battery pack 20 held in its half-locked state is pulled away from the mounting portion by hand. Hence, the pack 20 in the half-locked state can be easily removed from the mounting portion 11.

Figure 5:
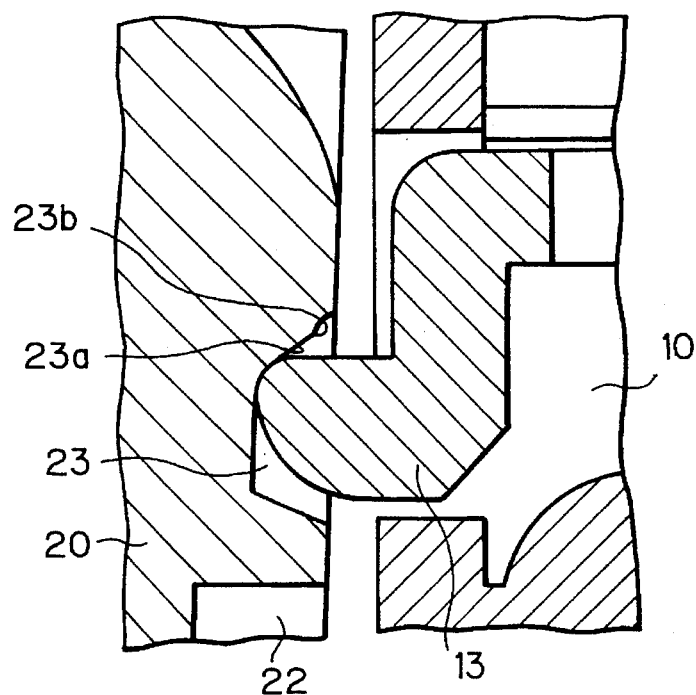
FIG. 5 is an enlarged section showing an alternative embodiment of the present invention.

Referring to FIG. 5, an alternative embodiment of the present invention will be described. This embodiment is similar to the previous embodiment except for the following. As shown, the wall 23a of the second recess 23 is provided with a stop 23b for contacting the movable hook 13. The stop 23b is sized such that the hook 13 can easily get over the stop 23b when the battery pack 20 held in its half-locked state is pulled out, but cannot get over it when a shock or an impact acts on the apparatus.

With the above configuration, this embodiment not only promotes the easy removal of the battery pack 20 in its half-locked state, but also prevents the pack 20 from slipping out of the casing 10 due to a shock or an impact.

In summary, it will be seen that the present invention provides a portable electronic apparatus having a simple construction and surely preventing a battery pack from slipping out of its casing by accident.

Various modifications will become possible for those skilled in the art after receiving the teachings of the present disclosure without departing from the scope thereof. For example, in the embodiments shown and described, the wall 23a of the recess 23 is inclined toward the mounting portion 11. Alternatively, the wall 23 may extend horizontally toward the movable hook 13, in which case the release button 15 will be pressed to cancel the half-locked state of the battery pack 20. Of course, the present invention is applicable not only to a handy phone but also to any other electronic apparatus, e.g., portable radio communication apparatus or portable video camera.

What is claimed is:

1. A portable electronic apparatus having a casing and a battery pack removably mounted to a mounting portion included in said casing, said apparatus comprising:

a movable hook positioned in said mounting portion and resiliently movable into or out of said mounting portion when a release button mounted on said casing is operated;

a first recess formed in said battery pack and engageable with said movable hook when said battery pack is mounted to said mounting portion; and a second recess adjoining said first recess, but positioned closer to said mounting portion than said first recess, and engageable with said movable hook when said battery pack moves away from said mounting portion after said first recess has been released from said movable hook.

2. An apparatus as claimed in claim 1, wherein said second recess has a wall for contacting said movable hook and inclined toward said mounting portion.

3. An apparatus as claimed in claim 2, further comprising a stop provided on said wall of said second recess and for contacting said movable hook.

* * * * *